United States Patent Office 3,448,365
Patented June 3, 1969

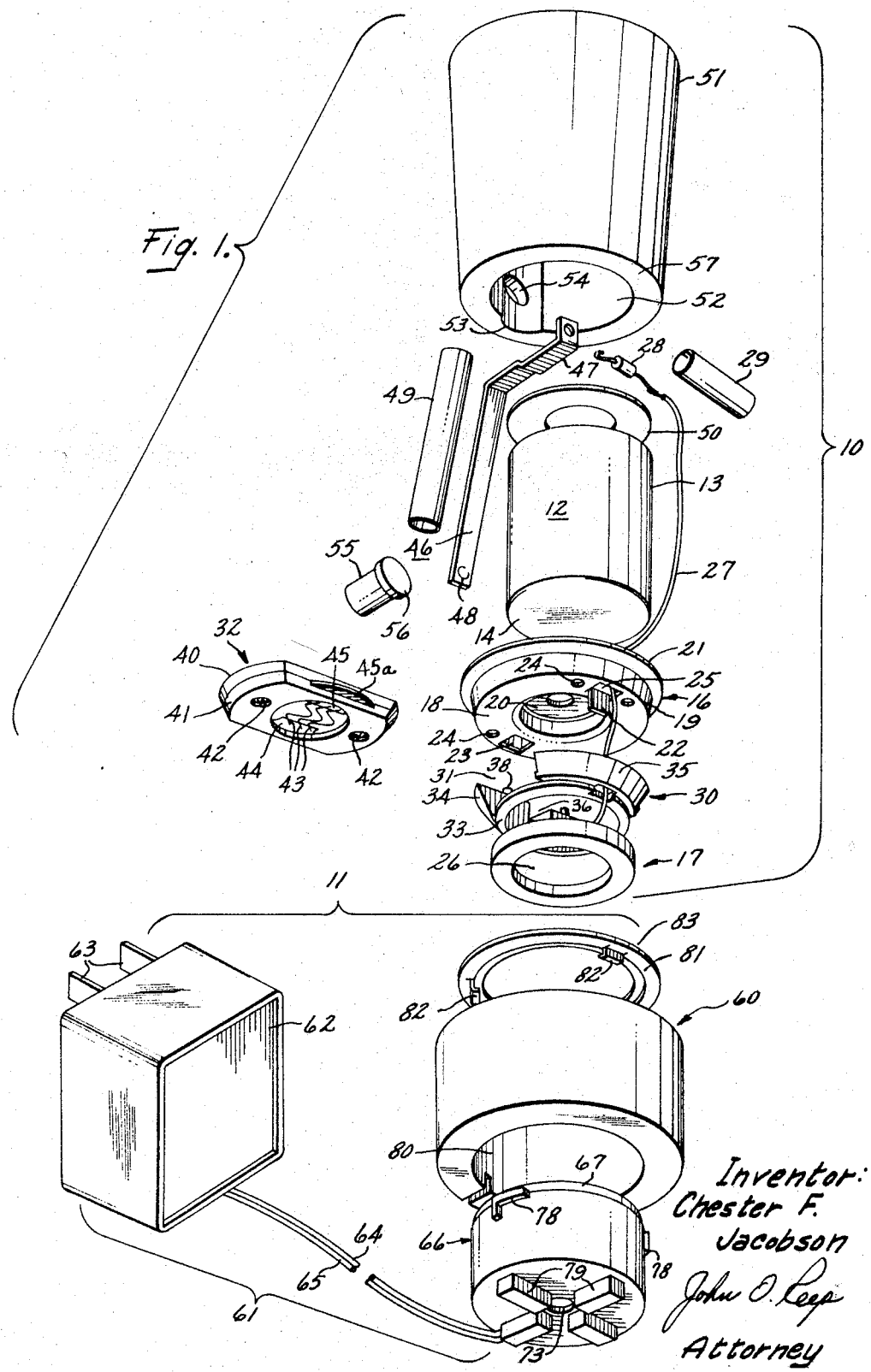

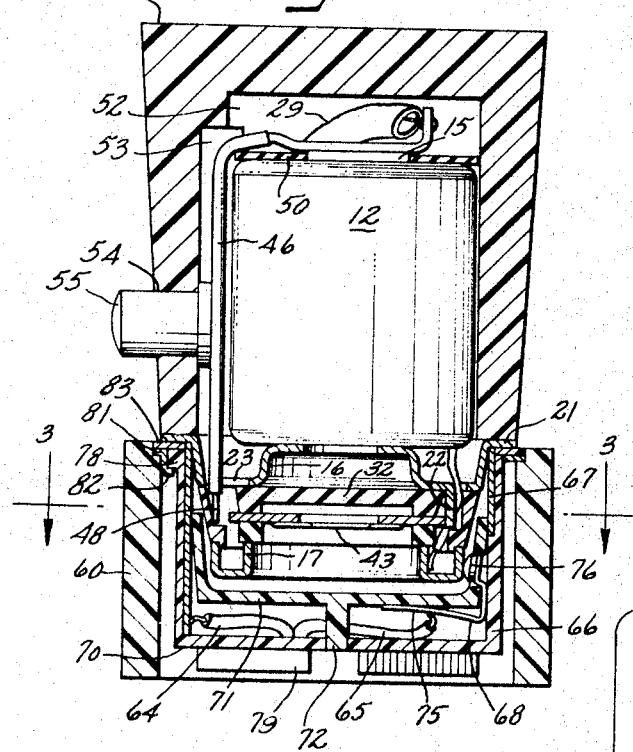
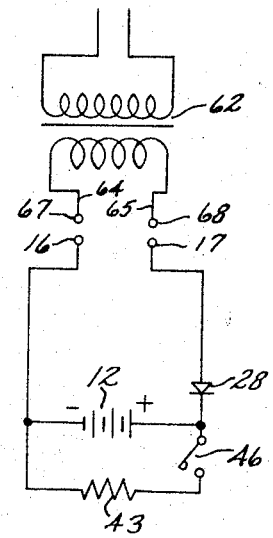
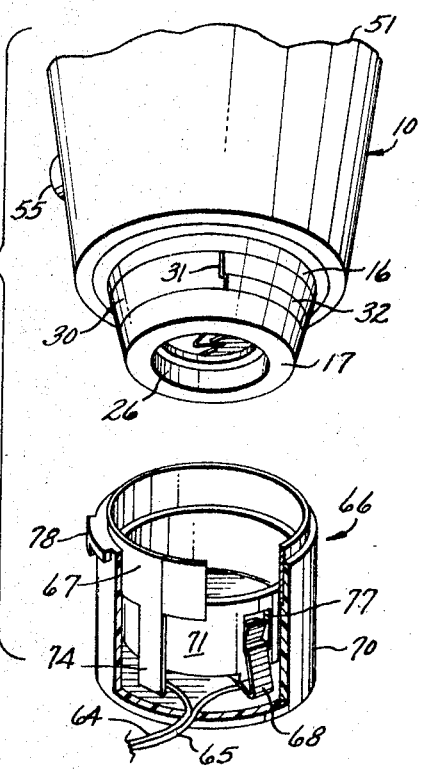
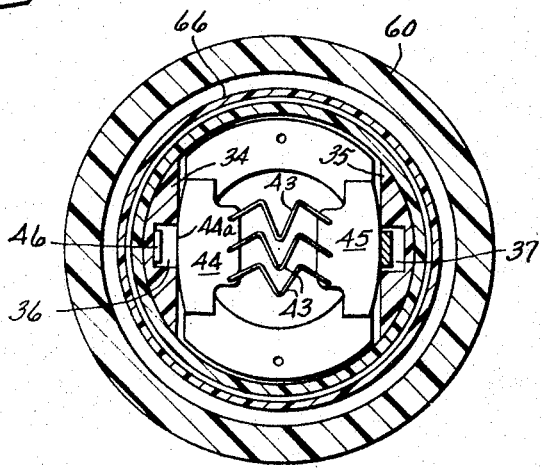

1

3,448,365
RECHARGEABLE BATTERY OPERATED CIGARETTE LIGHTER AND RECHARGING AND STORAGE DEVICE THEREFOR
Chester F. Jacobson, Asheboro, N.C., assignor to General Electric Company, a corporation of New York
Filed Aug. 15, 1966, Ser. No. 572,266
Int. Cl. H02j 7/02
U.S. Cl. 320—2                            5 Claims

ABSTRACT OF THE DISCLOSURE

A rechargeable, battery operated cigarette lighter and a recharging and storage device therefor which protects the lighter filament when the lighter is placed therein. The recharging device is separable from the storage device, and thus the storage device may be freely moved about while still performing its basic functions as a support and as a protective cover for the filament.

The present invention relates to rechargeable battery operated cigarette lighters and recharging and storage devices therefor.

Electrical battery operated cigarette lighters have, in the past, generally included a battery disposed in a casing, and a resistance heater filament which obtains electrical energy to heat the filament from the battery. For the purpose of concealing the filament when the lighter is not in use, the lighters have generally utilized a pivotal or sliding cover or lid member which is mounted on the lighter itself. When it is desired to use the lighter, this cover member has been adapted to be actuated by the user's finger or thumb out of the way of the filament. Most often, this same movement of the cover which exposes the filament is used also to provide engagement of electrical contacts so as to place the filament in closed electrical circuit with the battery.

Electrical cigarette lighters using rechargeable batteries have also been known in the past. These rechargeable battery lighters have, in addition to the structure mentioned above, included electrical contacts at the end opposite from the filament and filament cover so that when the lighter is positioned in a suitable recharging stand, an electrical potential exists across the contacts to recharge the battery.

While cigarette lighters such as those just mentioned are quite satisfactory when properly designed, it remains that the use of a pivotal or slidable cover or lid carried by the lighter introduces certain problems. Among these problems are the cost of the cover itself and of providing a good serviceable pivotal or slidable connection between the filament cover and the casing of the lighter. As mentioned, the prior art has generally utilized the movement of the cover to engage contacts to place the filament in circuit with the battery, and the designer has been faced with problems of effectively interrelating the cover movement with contact movement to assure that the contacts will, in fact, be engaged when the cover has been moved away from the filament. These problems become even more acute if the filament is to be made sufficiently large such as to be capable of lighting a cigar.

It is, therefore, a primary object of the present invention to provide a rechargeable battery operated cigarette lighter and recharging and storage device which is particularly useful as a so called table model lighter and which overcomes the above-mentioned problems associated with using a cover member mounted on the casing of the lighter, but still effectively conceals the filament when the lighter is not in use.

2

Another object is to provide a rechargeable battery operated cigarette lighter and recharging and storage device which utilizes a minimum of parts and assures good electrical contact between the recharging device and the battery when the battery is being recharged, and between the battery and the filament when the lighter is to be used for its intended purpose.

A further object of this invention is to provide a recharging and storage device for a rechargeable battery operated cigarette lighter wherein the device includes a recharging unit which is removably received in a supporting stand so that, if desired, the recharging unit and attached electrical wires may be removed from the stand while the lighter is still supported and attractively displayed by the stand itself.

Briefly stated, in accordance with one aspect of the present invention, a rechargeable battery operated cigarette lighter is provided which eliminates the need for a separate filament cover member carried by the lighter. This is accomplished by a construction wherein the filament is concealed, when not being used to light cigarettes, by a recharging receptacle, and wherein the act of positioning the filament in the receptacle causes cooperating contacts between the battery and recharging unit to be engaged for recharging the battery.

As another aspect, there is provided a supporting stand in which the recharging receptacle is removably mounted, and this supporting stand is also capable of supporting the cigarette lighter in a manner wherein the filament is concealed. Thus, once the battery has been recharged, the recharging receptacle and attendant electrical wires may be temporarily removed, and the lighter is still attractively displayed in the supporting stand and capable of being used as long as the battery remains charged.

Further features, objects and advantages of the present invention may best be understood by reference to the following description taken in connection with the accompanying drawings in which:

FIG. 1 is an exploded perspective view of the lighter and recharging and storage device of the present invention;

FIG. 2 is a sectional elevational view of the lighter as positioned in the recharging and storage device;

FIG. 3 is a sectional view taken along line 3—3 of FIG. 2;

FIG. 4 is a perspective view of the lighter and recharging receptacle portion of the recharger and storage device with portions of the receptacle broken away to illustrate internal components; and FIG. 5 is a schematic wiring diagram of the electrical circuit employed in the device of the present invention.

Now referring to the drawings in further detail, a rechargeable battery operated cigarette lighter is indicated generally by the numeral 10, and a recharging and storage device for the lighter is indicated generally by the numeral 11.

The lighter includes a rechargable nickel-cadmium type battery 12 of known construction. The battery has a generally cylindrical conductive outer side wall 13 which, together with a conductive bottom wall 14 is electrically connected to the negative plate or anode of the battery. A terminal 15 centrally disposed on the top wall of the battery is electrically connected to the positive plate or cathode of the battery. First and second battery recharging conducting members 16 and 17 are electrically connected respectively to the anode and cathode of the battery in order to provide a path for a recharging current when the battery is being recharged in a manner which will be pointed out hereinafter in greater detail. A suitable rechargable battery is one which has an output rating of 2 amp hours and approximately 1.2 volts D.C. across the terminals.

The first conducting member 16 may be described as having generally the shape of a cup with a bottom wall 18 and a side wall 19. The bottom wall has a depressed central portion 20 the inner surface of which may be welded or otherwise suitably secured to the bottom wall of the battery. An integral annular flange 21 extends outwardly from the top edge of the side wall 19; and when the member is secured to the battery, the flange is disposed outwardly of the outer surface of the side wall of the battery. An integral tab portion 22 is struck from the bottom wall 18 and extends downwardly with respect thereto for a reason which will become apparent as the description proceeds. Diametrically opposed apertures 23 and 25 extend through the bottom wall, and holes 24 also extend through the bottom wall spaced slightly from opposite sides of each of the apertures. The side wall 19 tapers slightly inwardly from the junction between the side wall and the flange 21 toward the junction between the side wall and the bottom wall 18.

The second conducting member 17 is in the form of an annular ring having a central opening 26, and the body of the ring is generally U-shaped in cross section. An insulated electrical wire 27 connects the member 17 to the anode 15 of the battery through the medium of a diode 28 which is poled in a manner illustrated more clearly at FIG. 5. so as to provide unidirectional charging current of proper polarity to the battery when the battery is being recharged. An insulating sleeve 29 is placed around the diode. A suitable diode which can be used is a silicon rectifier having a rating of 200 milli-amps D.C.

An electrically insulating member 30 formed of nylon or other suitable insulating material is used to electrically insulate the conducting members 16 and 17 from each other and to provide a channel 31 for reception of a heater filament assembly 32. The member 30 includes a ring-like bottom portion 33 which is received in the conducting member 17 and is suitably secured thereto such as through the medium of a suitable adhesive. Opposed upstanding wall portions 34 and 35 provide the side walls of the channel 31. Each of the side walls includes a cut-away portion 36 and 37 and these cut-away portions are located diametrically across from each other. The top surface of each of the walls has a pair of integral pins 38 extending therefrom and spaced so as to be capable of being received in the holes 24 in the conducting member. The insulating member 30 may therefore be secured to the bottom wall of the member 16 by any suitable adhesive, and the pins positively locate the insulating member in a predetermined position with respect to the conducting member. When the two members 16 and 30 are connected in this manner, the tab 22 projects into the cut-away portion 37 as seen clearly at FIG. 2 and the tab is disposed along one side of the channel 31.

The filament assembly 32, which is adapted to be slidably and removably received in the channel 31, includes opposed electricallly insulating layers 40 and 41 which are suitably secured together such as by screws 42 or rivets. The filament in preferred form includes three electrical resistance heaters 43 which are electrically connected in parallel with each other between opposite conductor plates 44 and 45. The part of the assembly including the conductor plates and heaters are clamped between the insulating layers with the outer side edges 44a and 45a of the plates extending slightly beyond the outer edges of the layers as is clear from FIGS. 1, 2 and 3.

When the conducting members 16 and 17, insulating member 30 and battery 12 are secured together in the manner illustrated at FIG. 2, and when the filament assembly 32 has been positioned in the channel 31, the conductor plate 45 makes electrical contact with the tab 22 and therefore one side of the heater filaments are connected to the anode of the battery through the medium of the conducting member 16. Means are provided in the nature of an electrically conducting resilient switch arm 46 to permit the user to connect the cathode of the battery to the conductor plate 44 of the filament assembly. The switch arm has one end 47 which is electrically connected to the cathode, and the other end 48 of the switch arm extends through aperture 23 into the cut-away portion 36. The end 48 of the switch arm extends through aperture 23 into the cut-away portion 36. The end 48 of the switch arm is disposed adjacent to the conductor plate 44 but is normally biased out of engagement with this latter conductor plate. When, however, the user manually forces the switch arm into contact with the conductor plate, the two plates 44 and 45 are, in effect, clamped between the switch arm 46 and the tab portion 22 to complete an electrical circuit from the battery through the heater filaments. This clamping action assures good electrical contact between plate 45 and tab 22 and between plate 44 and switch arm 46. An outer insulating sleeve member 49 is used to insulate the switch arm from the side wall of the battery and from the conducting member 16, and an insulating washer 50 is placed on top of the battery around the cathode.

In order to provide an outer cover for the battery and to provide a means by which the user can conveniently grasp the lighter, an outer housing 51 may be formed of plastic, wood or other suitable material. This housing includes an opening 52 sufficiently large to receive the battery, and a groove 53 is disposed along one side of the opening to accommodate the switch arm 46. A hole 54 provides communication between the groove and the exterior surfaces of the housing. As seen clearly at FIG. 2, a manual push button 55 is received in the hole, and this button has an inner flange 56 larger than the hole so that the switch arm normally biases the flange against the internal surface of the portion of the groove surrounding the hole. The push button, then, provides a means for the user to manually force the end 48 of the switch arm against the conductor plate 44, to complete an electrical circuit from the battery through the filament heaters.

It is to be noted that the lighter parts including the battery 12, conducting members 16 and 17, insulating member 30, switch arm 46 and wire 27 may be connected together as a complete assembly before this assembly is secured to the housing 51. Then, the assembly is inserted into the housing opening until the flange 21 engages and is secured by a suitable adhesive to the outer edge of the wall 57 surrounding the opening 52. The conducting members 16 and 17 together with the insulating member 30 thereby form a portion projecting from the housing; and, when the filament assembly 32 has been positioned in channel 31, the filament is also carried by this projecting portion. Access to the filament for lighting cigars or cigarettes is gained through the central opening 26 in conducting member 17.

The preceding description has been directed to the various elements making up the cigarette lighter. One important feature of the present invention resides in the manner in which the projecting portion carrying the filament is received in an appropriate recharging and storage device so that the filament may be concealed when not being used for its intended purpose of lighting cigarettes without using a separate cover member carried by the lighter itself, and wherein the act of so positioning the lighter and concealing the contacts also easily establishes good electrical contact between cooperating contacts for recharging purposes. A preferred embodiment of a recharging and storage device which is used in combination with this lighter to accomplish this feature will now be described in greater detail.

The recharging and storage device, in preferred form, includes a support stand 60 and a recharging unit 61 as separable components.

The recharging unit includes a transformer 62 of any suitable known construction which is mounted within a casing having contact prongs 63 extending therefrom for connecting one side of the transformer to a household supply outlet. Insulated conducting wires 64 and 65 lead from the low voltage side of the transformer to a recharging receptacle 66, one of the wires being electrically connected to a first electrical contact 67 in the receptacle, and the other wire being electrically connected to a second electrical contact 68 in the receptacle. A suitable transformer will provide approximately 3.4 volts. A.C. across the contacts 67 and 68 when the prongs 63 are plugged into a normal 115 volt A.C. household source.

The receptacle 66 includes a generally cylindrical outer casing 70 and an inner cup 71 each formed of an electrically insulating material such as moldable plastic. The cup is received within the casing and includes an integral peg 72 extending from the bottom wall thereof which is received in a hole 73 in the bottom wall of the casing. The cup may be permanently adhered to the casing, or may be held in place simply by the frictional engagement between the contacting surfaces. The first contact 67 comprises a ring-like member which is clamped between the cup and casing, and the upper edge of the ring extends slightly above the top end of the casing (see FIG. 4). An integral tab 74 extending downwardly from the ring provides means to connect the ring to the conductor 64. The second contact 68 includes a base portion 75 which may be fastened to the outer surface of the cup 71 and the contact also includes an upstanding portion including a button contact 76 which extends into an aperture 77 in the side wall of the cup. The metallic material from which the contact is formed is resilient in nature so that the portion which extends into the cup is capable of being moved outwardly toward the casing. A plurality of spaced generally L-shaped circumferential ribs 78 are formed on the outer surface of the casing near the top edge thereof in order to permit the receptacle 66 to be removably attached to the support stand 60. Integral bars 79 on the base of the casing permit the user to easily grasp the casing when it is to be attached to or removed from the support stand.

The support stand 60 includes walls defining an opening 80 which opening extends all the way through the stand. A ring 81 is secured on a ledge formed near the top of the opening through the support member and the ring includes a number of spaced circumferential inwardly extending ledge portions 82 which project a slight distance into the opening. The same number of ledge portions are used as the number of ribs 78 on the outer surface of the receptacle casing. A retaining member 83 clamps the ring in place, and the retaining member together with the projections provides means for receiving the ribs as seen clearly at FIG. 2. Alternately, the members 81 and 83 could be welded together and then adhered to the support stand.

While, in preferred form, the support stand is used, it is to be understood that the device may also be used without the support stand. Thus, turning to FIG. 4, the lighter 10 and recharging receptacle 66 are illustrated in respective positions corresponding to the time just before the lighter has been placed in the recharging receptacle or just after the lighter has been removed from the receptacle. As stated above, the conducting members 16 and 17 together with the insulating member 30 carrying filament assembly 32 may be said to comprise a projection which extends from the housing 51. The conducting member 17 is sufficiently small in diameter to pass through the ring-like contact member 67, but the member 17 will wipingly engage the second contact 68 when the lighter is positioned in the receptacle. The diameter of the ring contact 67 is preferably just slightly less than the diameter of the conducting member 16 at the juncture between the side wall 19 and the flange 21. The entire weight of the lighter thereby rests on the ring so that assurance is gained of good surface contact between the conductor 16 and the contact 67 when the projection is positioned in the receptacle.

It is now to be understood that, assuming the lighter is properly positioned in the receptacle, and assuming a suitable electrical potential exists across the contacts 67 and 68, an electrical circuit can be traced from the contact 68 through conducting member 17, conductor wire 27 and diode 28 to the positive terminal of the battery. From the negative terminal, or anode of the battery, the circuit continues through the conducting member 16 to the contact ring 67 in the recharging receptacle.

When it is desired to use the support stand, the receptacle 66 may be removably attached thereto by inserting the receptacle into the opening 80 from the bottom of the stand so that the ribs 78 are first located between the ledge portions 82. Then the recetpacle is attached to the stand by turning the receptacle in a clockwise direction until the ribs are located on top of the ledge portions and beneath the retaining member 83. The ledges thereby prevents the ribs and casing from dropping back down through the opening until the user removes the ribs from the projections by turning the receptacle in a counter-clockwise direction. With the receptacle and support stand attached in this manner, the lighter can be placed therein for recharging and storage as seen as FIG. 2.

It is to be noted that even if the recharging unit including the receptacle is removed from the support stand, the lighter may still be removably received in the support stand and attractively displayed and capable of being used as long as the battery remains charged. This is accomplished by having the opening 80 in the support stand larger than the projecting portion of the lighter, but smaller than the outer diameter of the flange 21. The projecting portion of the lighter can therefore be placed within the opening and the lighter is supported in the stand by virtue of the fact that the flange 21 rests on the outer wall of the support stand surrounding the opening.

The foregoing is a description of an illustartive embodiment of the invention, and it is applicant's intention in the appended calims to cover all forms which fall within the scope of the invention.

I claim:
1. A rechargeable battery operated cigarette lighter and recharging and storage device; said lighter including a housing for a rechargeable battery, a projecting portion extending from said housing, said projecting portion including an electrical resistance heater filament and means for electrically connecting said filament across said battery, and said lighter further including first and second electrical battery recharging conducting members spaced from each other and electrically connected to opposite terminals of said battery; said recharging and storage device including a receptacle for removably receiving said projecting portion, first and second spaced electrical contacts positioned to be engaged respectively by said first and second conducting members when said projecting portion is positioned in said receptacle, means for connecting said first and second electrical contacts to a source of electrical recharging energy; said first and second conducting members being separated from each other by an electrically insulating member forming a part of said projecting portion; said insulating member including wall portions defining a channel for removably receiving said resistance heater filament; and said heater filament being disposed within and concealed by said receptacle when said projecting portion is positioned within said receptacle and said battery is being recharged through said contacts.

2. The device as set forth in claim 1 wherein said first conducting member includes an integral tab portion for making electrical contact with one side of said heater filament and wherein said means for electrically connecting said filament across said battery includes a resilient switch arm which is electrically connected at one end thereof to the opposite terminal of the battery from said first conducting member, and the other end of said arm is normally disposed adjacent to and silghtly spaced from the opposite side of said heater filament, and said device further includes means for manually actuating said switch arm to electrically connect said filament across said battery by clamping said heater filament between said tab portion and said switch arm.

3. The device as set forth in claim 1 wherein said second conducting member comprises an electrically conducting ring having a central opening through which said lighter filament is exposed when said lighter is removed from said recharging receptacle.

4. A rechargeable battery operated cigarette lighter and recharging and storage device; said lighter including a rechargeable battery, a first metallic conducting member electrically connected to one terminal of said battery and having a flange extending beyond the outer surface of said battery, a second metallic conducting member electrically connected to the opposite terminal of said battery, an electrically insulating member positioned between said first and second conducting members and including wall portions defining a channel for removably receiving a resistance heater filament assembly, said first conducting member including an integral tab portion disposed along one side of said channel for making electrical contact with one side of said heater filament when said filament assembly is received in said channel, an electrically conducting switch arm electrically connected to said opposite terminal of said battery and having a portion disposed adjacent the opposite side of said channel from said tab portion but normally biased out of engagement with the opposite side of the heater filament, said switch arm being manually movable into engagement with said opposite side of said filament to electrically connect said filament between said switch arm and said tab portion, a housing having an opening surrounded by a wall with an outer edge for receiving said battery, said flange being secured to the outer edge of the wall surrounding said opening, and said insulating member and said second conducting member projecting from said housing; and said recharging unit comprising a recharging receptacle including first and second recharging contacts adapted to be connected to a source of recharging energy and positioned to make electrical contact respectively with said first and second conducting members whereby said filament is concealed in said receptacle when said battery is being recharged.

5. A rechargeable battery operated cigarette lighter and recharging and storage device; said lighter including a housing for a rechargeable battery, a projecting portion extending from said housing, said projecting portion including an electrical resistance heater filament and means for electrically connecting said filament across said battery, and said lighter further including first and second electrical battery recharging conducting members spaced from each other and electrically connected to opposite terminals of said battery; said recharging and storage device including a receptacle for removably receiving said projecting portion, first and second spaced electrical contacts positioned to be engaged respectively by said first and second conducting members when said projecting portion is positioned in said receptacle, said first contact comprising a ring-like member which forms at least a portion of the top edge of said receptacle, and said first conducting member having a slightly tapered external surface, a portion of which is of slightly larger diameter than said ring-like member for engaging said ring-like member and thereby assuring good surface electrical contact engagement between said ring-like member and said first conducting member when said projecting portion is received in said receptacle; and means for connecting said first and second electrical contacts to a source of electrical recharging energy, whereby said heater filament is disposed within and concealed by said receptacle when said projecting portion is positioned in said receptacle and said battery is being recharged through said contacts.

References Cited
UNITED STATES PATENTS

| | | | |
|---|---|---|---|
| 1,757,889 | 5/1930 | Wheat | 40—11.3 |
| 2,443,743 | 6/1948 | McNabb | 339—88 |
| 3,005,090 | 10/1961 | Moore | 320—3 X |
| 3,277,271 | 10/1966 | Hunt | 320—2 X |
| 3,329,880 | 7/1967 | Boyles | 320—2 |
| 3,348,116 | 10/1967 | Freeman et al. | 320—2 |
| 3,143,697 | 8/1964 | Springer | 320—2 |
| 3,371,260 | 2/1968 | Jackson et al. | 320—2 |

LEE T. HIX, *Primary Examiner.*

STANLEY WEINBERG, *Assistant Examiner.*

U.S. Cl. X.R.

219—268